United States Patent [19]

Hoffman

[11] 3,953,242

[45] Apr. 27, 1976

[54] NOVEL PRODUCTS
[75] Inventor: Arnold Hoffman, Brookline, Mass.
[73] Assignee: Polaroid Corporation, Cambridge, Mass.
[22] Filed: Oct. 26, 1973
[21] Appl. No.: 409,857

Related U.S. Application Data
[63] Continuation-in-part of Ser. No. 50,354, June 26, 1970.

[52] U.S. Cl. ............................... 136/155; 136/107
[51] Int. Cl.² ......................................... H01M 6/04
[58] Field of Search ................ 136/154, 155, 6 LN, 136/107, 125

[56] References Cited
UNITED STATES PATENTS

| | | | |
|---|---|---|---|
| 2,566,114 | 8/1951 | Block | 136/155 X |
| 2,950,999 | 8/1960 | Craig et al. | 136/155 |
| 3,160,526 | 12/1964 | Ruetschi | 136/154 X |
| 3,373,058 | 3/1968 | Block | 136/155 X |
| 3,562,017 | 2/1971 | Lyall | 136/6 LN |
| 3,594,235 | 7/1971 | Moran | 136/155 X |
| 3,620,848 | 11/1971 | Epstein | 136/107 X |
| 3,658,593 | 4/1972 | Caiola et al. | 136/6 LN |
| 3,738,870 | 6/1973 | DeRossi | 136/155 X |

*Primary Examiner*—Winston A. Douglas
*Assistant Examiner*—John F. Niebling
*Attorney, Agent, or Firm*—Mart C. Matthews; Philip G. Kiely

[57] ABSTRACT

A galvanic cell, particularly a primary battery cell, having as the sole electrolyte a quaternary ammonium salt, particularly tetraalkyl ammonium chloride.

9 Claims, No Drawings

NOVEL PRODUCTS

CROSS REFERENCE TO OTHER APPLICATION

This application is a continuation-in-part of application Ser. No. 50,354, filed June 26, 1970.

BACKGROUND OF THE INVENTION

The durability and efficiency of electrochemical cells, particularly shelf life durability, is limited by, among other factors, corrosion of the metallic anode which causes dissolution of the anode and generation of hydrogen gas. For example, in the Leclanche primary battery cell, the zinc anode undergoes corrosion in the electrolyte resulting in dissolution of the zinc and the attendant impaired efficiency of the cell. Various methods for minimizing anode attack have been attempted, for example, by means of additives to the electrolyte and by treating the anode as by coating with a material to reduce anode attack. However, such materials must be compatible with the electrochemical system, particularly in the case of materials coated on the anode, and must not so insulate the anode as to prevent its satisfactory functioning.

Mercuric chloride is one of the materials widely employed as a metallic corrosion inhibitor in batteries. However, some problems arise in connection with the use of mercury, generally as a result of the method of flat battery manufacture which may result in inadequate amalgamation of the zinc anode.

In addition, mercury embrittles thin (e.g., up to 10 mils) zinc foil which substantially obviates the use of such thin foil in batteries of the flat, planar type such as those disclosed in U.S. Pat. Nos. 3,563,805; 3,617,387; and 3,734,780 and the like.

Copending application Ser. No. 50,354 is directed to the employment of quaternary ammonium halide as an addition to an ammonium chloride electrolyte.

The essence of the invention set forth in application Ser. No. 50,354 is to reduce or eliminate the mercury compounds by the addition or total substitution of a quaternary ammonium halide which does not embrittle foil but which provides a highly effective corrosion inhibitor.

Planar batteries of the type disclosed in the aforementioned U.S. patents are particularly suitable for employment in a film pack of the type sold for use in the photographic camera sold by Polaroid Corporation, Cambridge, Massachusetts, U.S.A. under the trademark SX-70.

In such cameras, the battery, disposed as a component of a film pack for employment in and in combination with the camera, provides the electrical energy necessary to operate the camera's exposure control, film transport and photoflash systems and, accordingly, such battery is required to operate in a sequential series of power generating modes which may or may not be interrupted by more or less extended recovery and/or storage times and under which conditions to deliver the required series of high current pulses dictated by the photographic system design. However, because the battery is employed in close proximity to photographic film units, the components of the battery can deleteriously effect the photographic system. For example, ammonia from the ammonium chloride electrolyte can fog a photographic negative.

SUMMARY OF THE INVENTION

The present invention is directed to a galvanic cell wherein the electrolyte consists essentially of a quaternary ammonium salt. The preferred quaternary ammonium salt is a tetraalkyl ammonium chloride, more preferably tetramethyl ammonium chloride. Combinations of quaternary ammonium compounds are also within the scope of the present invention.

DETAILED DESCRIPTION OF THE INVENTION

The present invention is directed to a galvanic cell employing as essentially the sole electrolyte a compound of the formula:

$$NR_4X$$

wherein R is an aliphatic or aromatic group, preferably an alkyl group, more preferably a 1–10 carbon alkyl group and X is a halide, e.g., bromide, chloride. The particularly preferred compounds are those containing 1–3 carbon atoms in the alkyl groups. Thus, it has been found that the greatest efficiency is achieved employing quaternary ammonium salts of relatively high solubility. The more soluble the compound, the greater the capacity of the cell. However, the quaternary ammonium halide, which is also a corrosion inhibitor, also adsorbs onto the electrode, thereby increasing internal resistance. Quaternary ammonium compounds which are most effective as corrosion inhibitors are less soluble and, therefore, would be lower in ionic conductivity. Thus, the selection of the particular quaternary ammonium compound should be governed by a consideration of the battery performance and corrosion resistance desired. It should be understood, however, that a limited amount of solubility may be incorporated into an otherwise relatively insoluble quaternary ammonium salt by the inclusion of suitable substituents on the R group, for example, carboxyl groups. A particularly preferred embodiment contemplates the employment of a relatively soluble and a relatively less soluble compound to achieve a balance of properties. For example, tetramethyl ammonium chloride and tetraheptyl ammonium chloride constitute a particularly preferred combination.

The preferred compounds within the scope of the present invention comprise the tetraalkyl ammonium chlorides. Such compounds not only provide electrical properties in cells equivalent to prior art electrolytes, but also are particularly suitable for use as corrosion inhibitors in cells employing metal anodes, such as zinc, lead and the like where corrosion of the anode is a problem, by providing in effect an "infinite" source of corrosion inhibitor, avoiding the problem of exhaustion of inhibitor which may occur in conventional inhibitors.

This is especially so if a flat anode is employed composed of fine powder zinc, rich in zinc oxide (see above-mentioned patents). Electrolyte placement in the zinc anode and slow dissolution of zinc oxide relative to amalgamation require the above-described "infinite" source of corrosion inhibitor.

In still another advantage, the electrolyte of the present invention permits the use of thin foil, e.g., 2 to 10 mils, as the anode in cells because no embrittlement takes place. Thus, such foil can be employed in flat batteries of the type described in the aforementioned patents which heretofore required the use of zinc powder as the anode to avoid the embrittlement problem.

The following non-limiting example illustrates the novel cells of the present invention.

EXAMPLE

Cells were assembled employing a powdered zinc anode, a manganese oxide-carbon slurry cathode and an electrolyte designated below.

The following table shows the electrolyte employed and the open circuit voltage (OCV) and the closed circuit voltage (CCV). The load resistance in all cases was 0.83 ohms and the CCV was measured 1 sec. after load was imposed.

Table

|  | Electrolyte | OCV | CCV |
|---|---|---|---|
| Control | 22 g. ammonium chloride<br>10 g. zinc chloride<br>2 g. hydroxyethyl cellulose<br>2 g. mercuric chloride<br>66 g. water | 1.85 | 1.55 |
| Example 1 | 22 g. tetramethylammonium chloride<br>2 g hydroxyethyl cellulose<br>26 g. water | 1.85 | 1.40 |
| Example 2 | 11 g. tetramethylammonium chloride<br>1 g. tetraethylammonium chloride<br>36 g. water<br>1 g. hydroxyethyl cellulose | 1.65 | 1.0 |

While the invention is described primarily in terms of a Leclanche battery, it should be understood that the novel electrolyte of the present invention may be employed in either primary or secondary batteries.

Since certain changes may be made in the above product without departing from the scope of the invention herein involved, it is intended that all matter contained in the above description shall be interpreted as illustrative and not in a limiting sense.

What is claimed is:

1. A galvanic cell comprising a metallic anode and a slurry cathode wherein the sole electrolyte consists of a quaternary ammonium halide.

2. The product as defined in claim 1 wherein said anode is zinc and said cathode is manganese oxide/carbon black.

3. The product as defined in claim 1 wherein the electrolyte consists of at least a first and second quaternary ammonium halide.

4. The product as defined in claim 1 wherein said quaternary ammonium halide is represented by the formula:

$$NR_4X$$

wherein R is a 1–10 alkyl or aromatic group and X is halide.

5. The product as defined in claim 1 wherein said quaternary ammonium halide is tetramethyl ammonium chloride.

6. The product as defined in claim 1 wherein said quaternary ammonium halide is tetraethyl ammonium chloride.

7. The product as defined in claim 3 wherein said first quaternary ammonium halide is tetramethylammonium chloride and said second quaternary ammonium halide is tetraheptylammonium chloride.

8. The product of claim 2 wherein said zinc anode comprises fine powder zinc.

9. The product of claim 2 wherein said zinc anode comprises thin zinc foil.

* * * * *